(12) United States Patent
Lee et al.

(10) Patent No.: US 8,974,936 B2
(45) Date of Patent: Mar. 10, 2015

(54) PRISMATIC SECONDARY BATTERY EMPLOYED WITH SAFETY GROOVE

(75) Inventors: Jinsoo Lee, Daejeon (KR); Kilyoung Lee, Daejeon (KR); Jin Kim, Daejeon (KR); Soonho Ahn, Seoul (KR); Joo-Hwan Sung, Daejeon (KR)

(73) Assignee: LG Chem, Ltd., Seoul (KR)

( * ) Notice: Subject to any disclaimer, the term of this patent is extended or adjusted under 35 U.S.C. 154(b) by 56 days.

(21) Appl. No.: 13/306,677

(22) Filed: Nov. 29, 2011

(65) Prior Publication Data

US 2012/0177961 A1 Jul. 12, 2012

Related U.S. Application Data

(63) Continuation of application No. PCT/KR2010/006255, filed on Sep. 14, 2010.

(30) Foreign Application Priority Data

Sep. 24, 2009 (KR) .................. 10-2009-0090396

(51) Int. Cl.
  *H01M 2/12* (2006.01)
  *H01M 2/02* (2006.01)
  *H01M 10/052* (2010.01)
(52) U.S. Cl.
  CPC .......... *H01M 2/1241* (2013.01); *H01M 2/0217* (2013.01); *H01M 10/052* (2013.01); *H01M 2/026* (2013.01); *H01M 2/0285* (2013.01)
  USPC ........................................................ 429/82
(58) Field of Classification Search
  CPC .... H01M 2/1241; H01M 2/0207; H01M 2/12
  USPC ........................................................ 429/82
  See application file for complete search history.

(56) References Cited

U.S. PATENT DOCUMENTS 7,140,380 B2 * 11/2006 Marubayashi et al. .... 137/68.25
2002/0041993 A1 * 4/2002 Kim et al. ..................... 429/56
(Continued)

FOREIGN PATENT DOCUMENTS

JP    2001-35467 A    2/2001
JP    2001-266804 A   9/2001
(Continued)

OTHER PUBLICATIONS

English Translation of JP2004-079330A.*
(Continued)

*Primary Examiner* — Patrick Ryan
*Assistant Examiner* — Lucas J O Donnell
(74) *Attorney, Agent, or Firm* — Birch, Stewart, Kolasch & Birch, LLP (57) ABSTRACT

A prismatic secondary battery includes an electrode assembly having a cathode, an anode, and a separator mounted in a prismatic battery case in a sealed state, the battery case including a hexahedral case body open at the top thereof, the hexahedral case body being made of a metal material, and a case cap coupled to the open top of the case body, the case cap having an electrode terminal, wherein the case body is provided at a region exhibiting a stress distribution equivalent to 40% or less of the maximum stress of the case in a high pressure state with a line-shaped safety groove configured to be ruptured when high pressure occurs in the battery, and the safety groove is configured such that a residual thickness of the case body is decreased toward the middle from opposite ends of the safety groove in the longitudinal direction.

14 Claims, 5 Drawing Sheets
(3 of 5 Drawing Sheet(s) Filed in Color)

(56) References Cited

U.S. PATENT DOCUMENTS

| | | | |
|---|---|---|---|
| 2003/0077505 A1* | 4/2003 | Goda et al. | 429/56 |
| 2005/0106451 A1* | 5/2005 | Kim et al. | 429/56 |
| 2006/0105229 A1* | 5/2006 | Mac et al. | 429/56 |
| 2008/0070097 A1* | 3/2008 | Uh | 429/53 |
| 2009/0068548 A1* | 3/2009 | Kaplan | 429/56 |
| 2009/0075159 A1* | 3/2009 | Uh et al. | 429/53 |

FOREIGN PATENT DOCUMENTS

| | | |
|---|---|---|
| JP | 2004-039294 A | 2/2004 |
| JP | 2004079330 A * | 3/2004 |
| JP | 2009-009889 A | 1/2009 |
| JP | 2009-147187 A | 7/2009 |
| KR | 10-2003-0066765 A | 8/2003 |
| KR | 10-2007-0027358 A | 3/2007 |
| KR | 10-2007-0027359 A | 3/2007 |
| KR | 10-2007-0056427 A | 6/2007 |

OTHER PUBLICATIONS

JP2004-39294A EN translation.*
International Search Report for PCT/KR2010/006255, mailed on May 23, 2011.

* cited by examiner

FIG. 1

*Prior Art*

PRISMATIC SECONDARY BATTERY EMPLOYED WITH SAFETY GROOVE

CROSS REFERENCE TO RELATED APPLICATIONS

This application is a Continuation of PCT/KR2010/006255 filed on Sep. 14, 2010, which claims priority under 35 U.S.C. 119 (a) to Patent Application No. 10-2009-0090396 filed in Republic of Korea on Sep. 24, 2009, all of which are hereby expressly incorporated by reference into the present application.

TECHNICAL FIELD

The present invention relates to a prismatic secondary battery having a safety groove, and, more particularly, to a prismatic secondary battery including an electrode assembly mounted in a prismatic battery case in a sealed state, the battery case including a hexahedral case body open at the top thereof, the hexahedral case body being made of a metal material, and a cap coupled to the open top of the body, the case cap having an electrode terminal, wherein the case body has a thickness of 0.4 mm or less, the case body is provided at a region exhibiting a stress distribution equivalent to 40% or less of the maximum stress ($S_{MAX}$) of the case in a high pressure state with a line-shaped safety groove configured to be ruptured when high pressure occurs in the battery, and the safety groove is configured in a structure in which a residual thickness ('a vent thickness') of the case body is decreased toward the middle from opposite ends of the safety groove in the longitudinal direction.

BACKGROUND ART

As mobile devices have been increasingly developed, and the demand for such mobile devices has increased, the demand for secondary batteries has also sharply increased as an energy source for the mobile devices. Among such secondary batteries is a lithium secondary battery having high energy density and high discharge voltage, on which much research has been carried out and which is now commercialized and widely used.

Depending upon the shape of a battery case, a secondary battery may be classified as a cylindrical battery having an electrode assembly mounted in a cylindrical metal container, a prismatic battery having an electrode assembly mounted in a prismatic metal container, or a pouch-shaped battery having an electrode assembly mounted in a pouch-shaped case formed of an aluminum laminate sheet.

The electrode assembly mounted in the battery case is a power generating element, having a cathode/separator/anode stack structure, which can be charged and discharged. The electrode assembly may be classified as a jelly roll type electrode assembly configured in a structure in which a long sheet type cathode and a long sheet type anode, to which active materials are applied, are wound while a separator is disposed between the cathode and the anode or a stacked type electrode assembly configured in a structure in which pluralities of cathodes and anodes having a predetermined size are sequentially stacked while separators are disposed respectively between the cathodes and the anodes.

Secondary batteries may be exposed to various environments according to use status and conditions. It is necessary to prevent explosion of the secondary batteries for the sake of safety of users. Generally, the batteries may explode due to high temperature and high pressure in the batteries caused by an abnormal operational status, such as an internal short circuit, charging exceeding allowable current and voltage, exposure to high temperature, impact due to falling, of the batteries. For these reasons, each of the batteries is provided with a high pressure solving device for solving high pressure of the battery, which is a direct cause for battery explosion, although the shapes of the batteries are different from one another.

In order to solve high pressure, for example, a cylindrical battery has a safety plate of a specific structure, which is mounted to a cap assembly, a prismatic battery has a safety groove formed at a cap or a case of the battery, and a pouch-shaped battery is configured such that sutured portions (sealed portions) of laminate sheets are separated from each other without use of an additional safety groove.

In a general prismatic secondary battery, closed type or a partially open type safety groove is formed at an aluminum battery case such that the safety groove can be cut out.

For example, a prismatic secondary battery has a partially open type safety groove formed at the side of a battery case.

Figure 1:
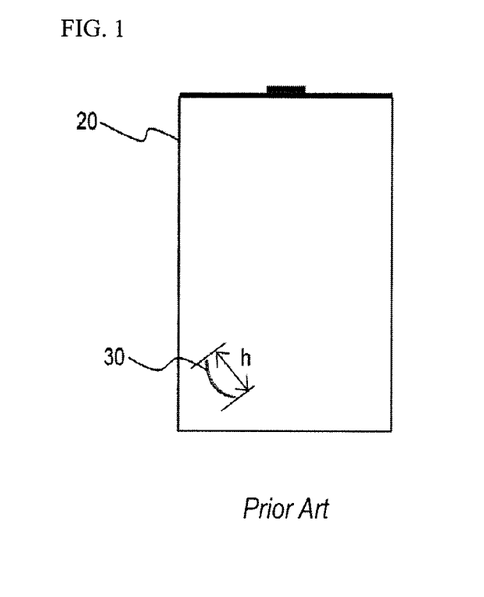
FIG. 1 is a typical view illustrating a prismatic secondary battery having a conventional safety groove.

A safety groove 30 of FIG. 1 is formed at a corner of the side of a case 20 of a prismatic secondary battery in the shape of a small contour. The safety groove is of a partially open type. That is, the safety groove is located at a region of the case exhibiting relatively high stress such that the curved safety groove can be ruptured when the internal pressure of the battery is excessively increased.

The safety groove having the structure as described above has an advantage in that the safety groove can relatively sensitively respond to high pressure generated in the battery; however, the safety groove has a disadvantage in that it is difficult to correctly set an intended critical pressure value intended during designing of the battery.

That is, as previously described, high stress is applied to the corner region of the side of the case, with the result that the safety groove may be easily ruptured even at low pressure. Above all, when the thickness of the battery case is small, the safety groove more sensitively responds to high pressure, with the result that unintended rupture of the safety groove is caused.

For this reason, it is necessary to decrease the size and depth of the safety groove formed at the region exhibiting high stress. When the size and depth of the safety groove are too small, however, the safety groove may not be easily ruptured.

Also, the shape of the safety groove is expected to be a very important factor in achieving reliable operation of the battery under abnormal conditions of the battery.

Therefore, there is a high necessity for developing a prismatic battery that is capable of quickly discharging gas from the battery through uniform rupture of a safety grove when the internal pressure of the battery is increased in synthetic consideration of thickness of a battery case, the position of the safety groove based on stress, and the shape, length, and depth of the safety groove.

DISCLOSURE

Technical Problem

The present invention has been made to solve the above problems, and other technical problems that have yet to be resolved.

As a result of a variety of extensive and intensive studies and experiments to solve the problems as described above, the inventors of the present invention have found that, when a safety groove of a specific structure as well as a specific shape is formed at a region of the side of a case of a battery exhibiting relatively low stress, the safety groove is reliably rupture in a proper condition, thereby improving safety of the battery.

Therefore, it is an object of the present invention to provide a prismatic secondary battery having a safety groove of an improved structure that can be effectively ruptured.

Technical Solution

In accordance with one aspect of the present invention, the above and other objects can be accomplished by the provision of a prismatic secondary battery including an electrode assembly consisting of a cathode, an anode, and a separator mounted in a prismatic battery case in a sealed state, the battery case including a hexahedral case body open at the top thereof, the hexahedral case body being made of a metal material, and a case cap coupled to the open top of the case body, the case cap having an electrode terminal, wherein the case body has a thickness of 0.4 mm or less, the case body is provided at a region exhibiting a stress distribution equivalent to 40% or less of the maximum stress ($S_{MAX}$) of the case in a high pressure state with a line-shaped safety groove configured to be ruptured when high pressure occurs in the battery, and the safety groove is configured in a structure in which a residual thickness ('a vent thickness') of the case body is decreased toward the middle from opposite ends of the safety groove in the longitudinal direction.

The safety groove of the prismatic battery according to the present invention is formed at a region of the case body exhibiting a stress distribution equivalent to 40% or less of the maximum stress of the case, i.e., relatively low stress. Consequently, it is possible to prevent the safety groove from being easily ruptured at low pressure, to provide high rupture pressure, and to deeply form the safety groove.

Also, the prismatic battery according to the present invention is configured in a structure in which the safety groove is formed at a specific position such that the depth of the safety groove is decreased toward the middle from the opposite ends of the safety groove in the longitudinal direction, as supported from experiment examples, which will be described later. Consequently, the safety groove provides high operational reliability of the battery, and gas is quickly discharged from the battery through uniform rupture of the safety groove, thereby securing safety of the battery.

In recent years, the size of the case has been greatly increased, and the case has been manufactured using a thin material. For this reason, the case body, to which the present invention is applied, preferably has a thickness of 0.2 to 0.4 mm. Consequently, the safety groove located at the specific position and formed in the specific shape is reliably ruptured at a proper critical value although the thickness of the battery case according to the present invention is much less than that of a general battery case.

The high pressure in the battery at which the safety groove may be ruptured is twice or more internal pressure of the battery in a normal condition. Here, the normal condition means that the battery is maintained at atmospheric pressure (one atmosphere) or two atmospheres.

Figure 4:
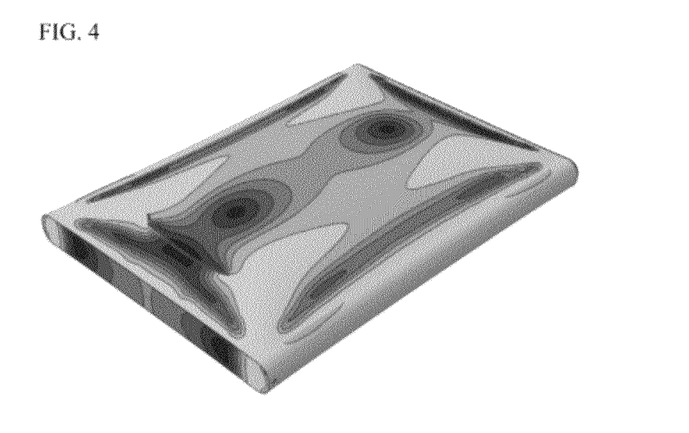
FIG. 4 is a photograph illustrating stress distribution of the prismatic secondary battery of FIG. 3.

As previously defined, the line-shaped safety groove is formed at a region of the case body exhibiting a stress distribution equivalent to 40% of less of the maximum stress ($S_{MAX}$) of the case in the high pressure state as described above The stress distribution may be variously changed depending upon the shape and structure of the battery case. A stress distribution generated in a general prismatic battery is shown in FIG. 4.

The inventors have found that, when the safety groove is formed at a region of the case body exhibiting a stress distribution equivalent to more than 40% of the maximum stress ($S_{MAX}$) of the case, the safety groove is easily ruptured even at low pressure. In conclusion, the safety groove is ruptured at higher pressure when the above conditions are satisfied than when the safety groove is formed at a region of the case body exhibiting a conventional high stress distribution, i.e., a stress distribution equivalent to more than 40% of the maximum stress ($S_{MAX}$) of the case.

The safety groove may be formed at a region of the case body exhibiting a stress distribution equivalent to preferably 10 to 40%, more preferably 25 to 35%, of the maximum stress ($S_{MAX}$) of the case.

Since the safety groove is formed at the region of the case body exhibiting relatively low stress, therefore, it is possible to prevent the safety groove from being easily ruptured at low pressure, to provide high rupture pressure, and to deeply form the safety groove.

Preferably, the safety groove is formed at a vertical center axis region of each main surface of the case body. More preferably, the safety groove is formed at a middle position having a size equivalent to ¼ to ½ of the lateral width of the case body and at an upper or lower position having a size equivalent to 1/20 to 1/5 of the vertical length of the case body.

If the position of the safety groove deviates from the above range, rupture of the safety groove and discharge of gas may not be achieved even at high pressure, and the safety groove may be ruptured even at low pressure. Therefore, deviation in position of the safety groove from the above range is not preferable in safety and assembly processability Experiments carried out by the inventors reveal that, when the internal pressure of the battery is continuously raised to a predetermined level as previously described, the safety groove is uniformly ruptured, with the result that gas is quickly discharged from the battery, thereby improving safety of the battery.

Preferably, the safety groove may be formed at a region of the case body corresponding to a space defined between the open top of the case body and a top of the electrode assembly mounted in the case body while the position at which the safety groove is formed is within the above-defined range. In a concrete example, the safety groove may be formed at a region of the case body corresponding to a space defined between maximum 5 mm from the upper end of the cathode of the electrode assembly mounted in the case body in the direction of the electrode assembly and the open top of the case body while being near the open top of the case body. The safety groove formed at such a position is located at the surplus region in the case, specifically at the top of the electrode assembly mounting region, with the result that discharge of gas is more easily achieved, and damage to the electrode assembly is minimized.

In particular, the safety groove according to the present invention is formed in an arc shape to prevent discharge of gas from being disproportionately concentrated on a portion of the safety groove, thereby minimizing pressure deviation upon rupture of the safety groove and securing strength of the case with respect to the thin case body.

Preferably, the arc shape of the safety groove has a radius of curvature equivalent to ½ to 1.5 times of a vertical length of the case body.

If the radius of curvature is too small, curvature is increased, with the result that the width of the arc shape is decreased. On the other hand, if the radius of curvature is too large, curvature is decreased, with the result that the rupture of the safety groove may be difficult even at high pressure.

Also, as long as the position and curvature of the safety groove do not deviate from the above-defined range, the safety groove may be formed in an upward arc shape in which the center of curvature of the arc shape is located at the upside or in a downward arc shape in which the center of curvature of the arc shape is located at the downside.

Meanwhile, the inventors have experimentally confirmed that, when the vent thickness of the safety groove was uniform, the safety groove was not effectively ruptured although the safety groove was formed at a region of the case body exhibiting relatively low stress in an arc shape.

That is, it was very difficult to form the safety groove such that the safety groove has a uniform vent thickness. As a result, pressure was concentrated on an arbitrary position of the case body, whereby operational reliability of the battery was deteriorated, and therefore, the case was deformed even at low pressure. Consequently, it was confirmed that the stress of the case body and the vent thickness were closely related to rupture of the safety groove and discharge of gas.

In a preferred example, the vent thickness may have an average value equivalent to 40 to 70% of the thickness of the case body. That is, the average value of the vent thickness may be decided within a range which can provide an optimum state in consideration of various factors as previously described.

Also, the minimum vent thickness at the middle of the safety groove may have a size equivalent to 20 to 50% of the thickness of the case body. If the minimum vent thickness is less than 20% of the thickness of the case body, the safety groove may be easily ruptured even at low pressure. On the other hand, if the minimum vent thickness is more than 50% of the thickness of the case body, the thickness difference between the middle and the opposite ends of the safety groove is less than a desired level as previously described, with the result that operational reliability of the battery is lowered.

Also, the vent thickness may be successively decreased toward the middle from the opposite ends of the safety groove. Here, "successively decreased" means "gradually decreased." Consequently, concentration of pressure on a specific region is prevented, and pressure deviation upon rupture of the safety groove is minimized.

The vent thickness at the middle of the safety groove is not particularly restricted as long as the vent thickness at the middle of the safety groove is less than the vent thickness at the opposite ends of the safety groove with the result that the safety groove can be easily ruptured. Preferably, the vent thickness at the middle of the safety groove has a size equivalent to 40 to 70% of the vent thickness at the opposite ends of the safety groove.

As can be seen from the above description, it was experimentally confirmed that the prismatic battery having the safety grove configured such that the vent thickness is decreased toward the middle from the opposite ends of the safety groove exhibited effective operational reliability.

The safety groove may be formed using various methods. Preferably, the safety groove is formed through rolling using an additional punch. According to circumstances, it is possible to scrape the case using a specific tool to form the safety groove.

The vertical section of the safety groove is not particularly restricted as long as the safety groove can be easily ruptured when the internal pressure of the battery is increased. For example, the vertical section of the safety groove may be formed in a downward wedge shape or in a trapezoidal shape. In case of the wedge shape, the upside of the safety groove is cracked, with the result that the safety groove is ruptured. In case of the trapezoidal shape, short sides of the safety groove are lengthened, with the result that the safety groove is ruptured due to shear stress. In conclusion, uniform and immediate rupture of the safety groove are induced, thereby securing safety of the battery.

The electrode assembly may be configured in a jelly-roll (winding type) structure in which a long sheet type cathode and anode are wound while a separator is disposed between the cathode and the anode, which has an advantage in that the jelly-roll is easily manufactured and has high energy density per weight.

More specifically, the secondary battery includes a lithium secondary battery.

Advantageous Effects

As is apparent from the above description, the prismatic secondary battery according to the present invention is configured in a structure in which a safety groove is formed at a specific region exhibiting relatively low stress in an arc shape such that the thickness of a vent of the safety groove is gradually decreased toward the middle of the safety groove over the overall length of the safety groove, with the result that the safety groove is reliably ruptured at relatively high internal pressure of the battery to effectively discharge high-pressure gas from the battery. Consequently, it is possible to greatly improve safety of the battery.

BRIEF DESCRIPTION OF THE DRAWINGS

The patent or application file contains at least one color drawing. Copies of this patent or patent application publication with color drawing will be provided by the USPTO upon request and payment of the necessary fee.

The above and other objects, features and other advantages of the present invention will be more clearly understood from the following detailed description taken in conjunction with the accompanying drawings, in which.

DETAILED DESCRIPTION OF THE INVENTION

Now, exemplary embodiments of the present invention will be described in detail with reference to the accompanying drawings. It should be noted, however, that the scope of the present invention is not limited by the illustrated embodiments.

Figure 2:
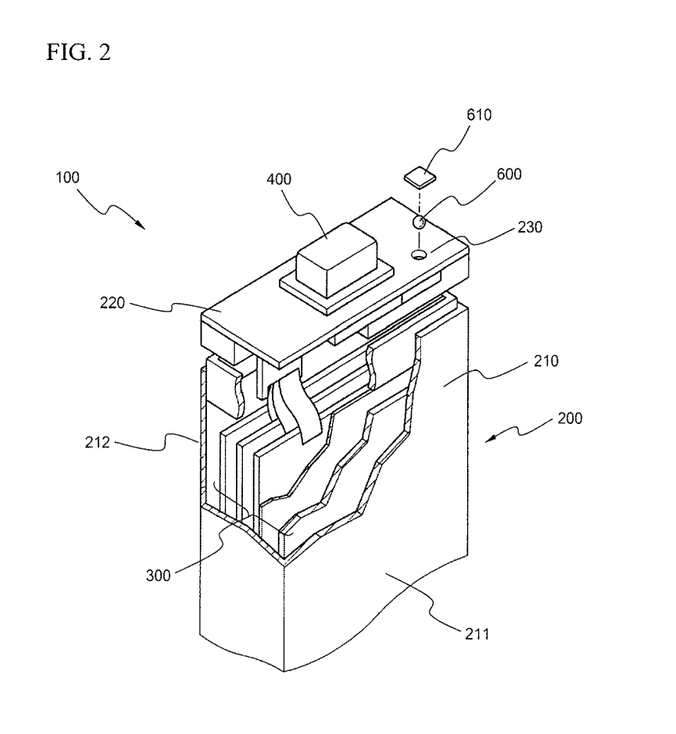
FIG. 2 is a typical view illustrating a prismatic secondary battery used in the present invention.

FIG. 2 is a view illustrating the structure of an example of a general prismatic secondary battery that can be used in the present invention.

Referring to FIG. 2, a prismatic secondary battery 100 includes an electrode assembly 300, which is configured in a jelly-roll structure in which a sheet type cathode and a sheet type anode are wound while a separator is disposed between the cathode and the anode, is mounted in a prismatic battery case 200, which serves as an anode terminal.

The case 200 includes a hexahedral case body 210 open at the top thereof, the hexahedral case body 210 being made of metal, and a cap 220 coupled to the open top of the case body 210, the cap 220 having a cathode terminal 400. The anode terminal may be the case body 210 or the cap 220 electrically insulated from the cathode terminal 400.

In order to manufacture such a prismatic secondary battery 100, the electrode assembly 300 is placed in the case body 210, the cap 220 is located at the open top of the case body 210, and a connection region between the case body 210 and the cap 220 is sealed by laser welding. Subsequently, an electrolyte is injected into the case 200. Electrolyte injection is performed through an injection port 230 formed at a one-side region of the cap 220. Specifically, the electrolyte is injected into the case 200 through the injection port 230, a ball member 600 made of aluminum is fitted into the injection port 230, and a thin metal sheet 610 is placed on the ball member 600 to close the injection port 230. In this state, the injection port 230 is sealed by laser welding. Sealing of the injection port 230 is not limited to the above method. Various other methods may be used to seal the injection port 230.

A safety groove according to the present invention is formed at a front side 211 or a rear side 212 of the case 200 of the prismatic secondary battery 100. The case body 210 has a thickness of approximately 0.3 mm.

Figure 3:
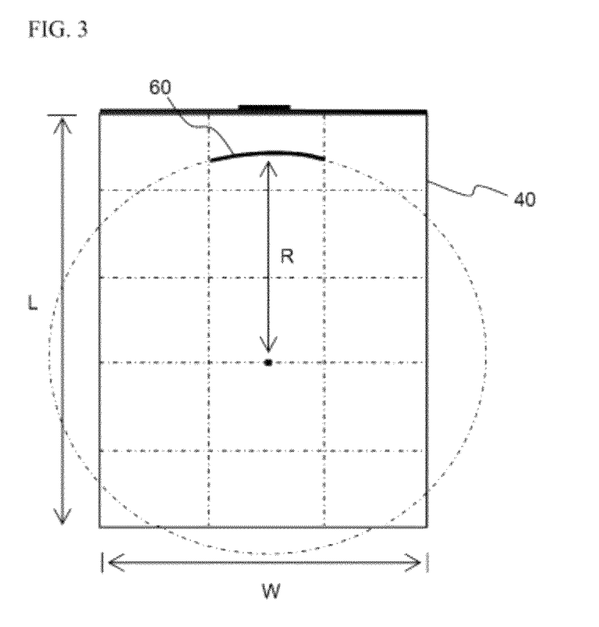
FIG. 3 is a typical view illustrating a prismatic secondary battery having a safety groove according to an embodiment of the present invention.

FIG. 3 is a plan view illustrating the shape of a safety groove according to an embodiment of the present invention, and FIG. 4 is a photograph illustrating stress distribution of the prismatic secondary battery of FIG. 3.

Referring to these drawings, a safety groove 60 formed at a case body 40 is a member that can be cut out to discharge high-pressure gas. The safety groove 60 is formed at a region of a case exhibiting a stress distribution equivalent to approximately 25 to 35% of the maximum stress $S_{MAX}$ of the case in an upward arc shape in which the center of curvature of an arc shape is located at the upside.

As shown in FIG. 4, stress distribution is shown in the form of a contour line of tensile stress per region occurring upon application of predetermined pressure. A high brightness region (a bright region) has relatively high stress. In other words, the high brightness region is a region where maximum stress $S_{MAX}$ is distributed. A low brightness region (a dark region) has relatively low stress. In other words, the low brightness region is a region where minimum stress $S_{MIN}$ is distributed.

The arc-shaped safety groove 60 is formed at a middle position having a size equivalent to approximately ⅓ of the width W of the case body 40 and at an upper end position having a size equivalent to approximately ⅒ of the length L of the case body 40. Also, the arc shape of the safety groove 60 has a radius R of curvature equivalent to approximately ½ of the length L of the case body 40. Because of such an arc shape, it is possible for the safety groove 60 to maintain uniform mechanical strength while achieving uniform discharge of gas.

As shown in FIGS. 3 and 4, the arc shape is formed such that the center of curvature of the arc shape is located at the upside. On the other hand, as shown in FIG. 5, the arc shape may be formed such that the center of curvature of the arc shape is located at the downside.

Figure 5:
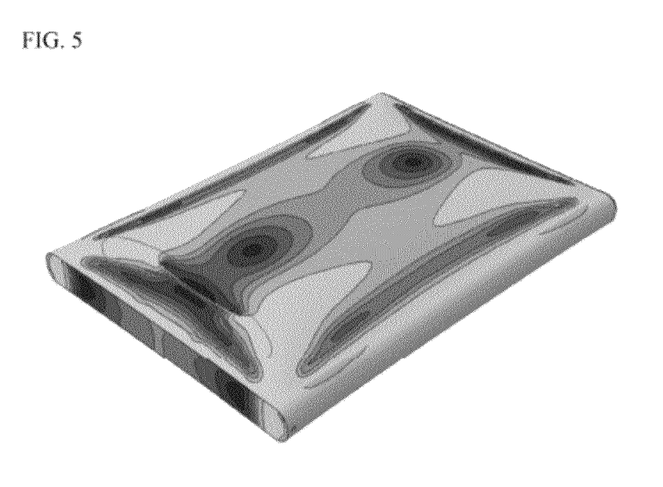
FIG. 5 is a photograph illustrating stress distribution of a prismatic secondary battery having a safety groove according to another embodiment of the present invention.

Referring to FIG. 5 together with FIG. 3, the safety groove of FIG. 5 is identical in position and curvature to the safety groove of FIG. 3 except that the arc shape of the safety groove of FIG. 5 is formed such that the center of curvature of the arc shape is located at the downside, and therefore, a detailed description thereof will not be given.

Figure 6:
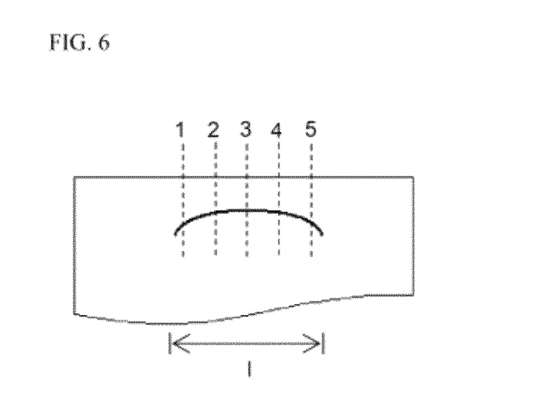
FIG. 6 is a plan view illustrating a portion of the prismatic secondary battery of FIG. 3 including the safety groove.
Figure 7:
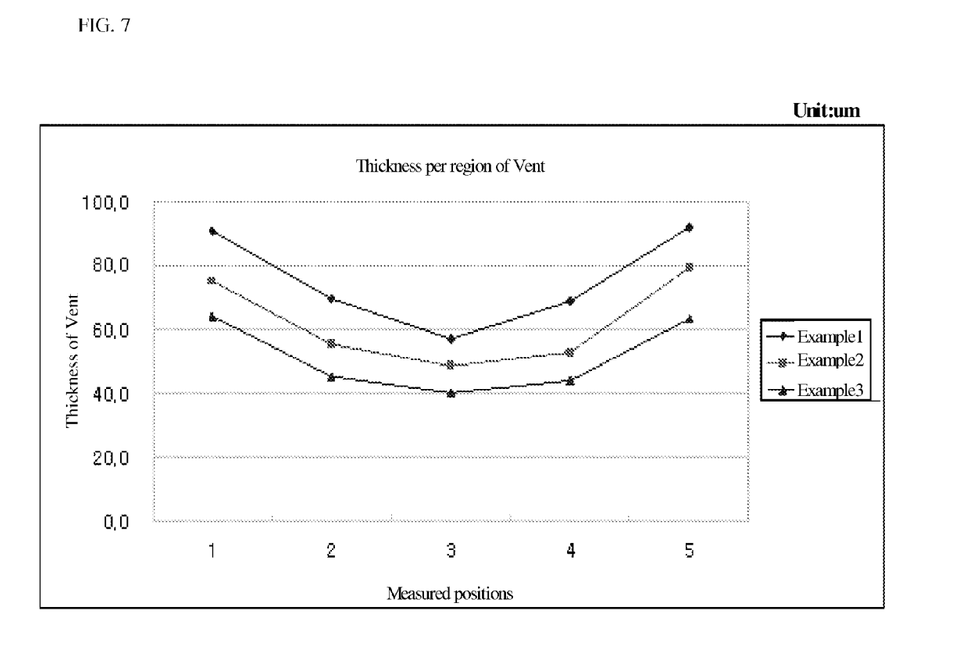
FIG. 7 is a graph illustrating a thickness per vent region of FIG. 6.
Figure 8:
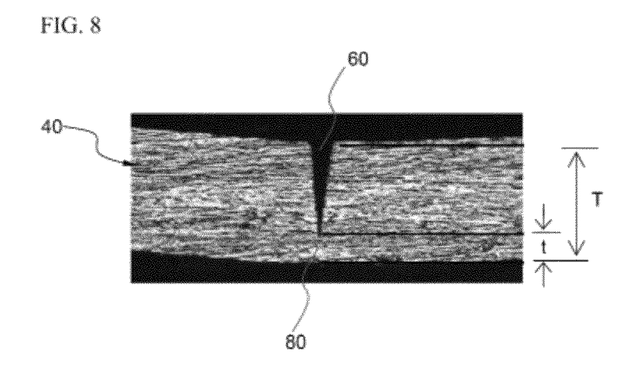
FIG. 8 is a photograph illustrating a vertical section of the safety groove of FIG. 3.

FIG. 6 is a partial plan view illustrating the shape of the safety groove, FIG. 7 is a graph illustrating a thickness per vent region of the safety groove of FIG. 6, and FIG. 8 is a photograph illustrating a vertical section of the safety groove of FIG. 3.

Referring to these drawings, the thickness of a vent 80 is gradually decreased from opposite ends 1 and 5 to the middle 3 of the safety groove over the entire length l of the safety groove. That is, the thickness t of the vent at the middle 3 of the safety groove 60 (see Example 1) is approximately 58 which is the minimum, with respect to the thickness T of the case body. At predetermined positions approaching the opposite ends of the safety groove, the vent has thicknesses t of approximately 70 μm and approximately 90 μm, respectively. That is, the thickness t of the vent is gradually increased toward the opposite ends of the safety groove.

Also, as shown in a graph of FIG. 7, it is possible to adjust the depth and range of the vent based on a proper range of the safety groove and adjustment of pressure (see Examples 2 and 3).

Meanwhile, the vertical section of the safety groove 60 is formed in a downward wedge shape, and the average thickness of the vent is approximately 60% of the thickness T of the case body 40.

When internal pressure gradually increases twice or more as much as normal internal pressure of the battery, therefore, cracks occurs at the safety groove, with the result that the safety groove is easily ruptured. Consequently, gas is quickly discharged from the battery, thereby improving safety of the battery.

Hereinafter, examples of the present invention will be described in more detail. It should be noted, however, that the scope of the present invention is not limited by the illustrated examples.

EXAMPLE 1

1-1 Manufacture of Cathode

A cathode active material containing $LiCoO_2$ was applied to an aluminum current collector, and then a cathode tab was attached to the end of the current collector, such that the cathode tab protruded upward, by spot welding, to manufacture a cathode.

1-2 Manufacture of Anode

An anode active material containing artificial graphite was applied to a copper current collector, an anode tab was attached to the end of the current collector, such that the anode tab protruded upward, by spot welding, and a polyimide film was wound at the interface between the current collector and the anode tab so as to surround the front, the rear, and one side of the anode tab such that the polyimide film protruded 5 to 6 mm from the upper end of the current collector to manufacture an anode.

1-3 Formation of Safety Groove

A safety groove was formed at an aluminum prismatic case having a thickness of approximately 250 to 270 μm in the vertical sectional shape of a wedge using a punch such that the safety groove was located at a position having a size equivalent to approximately 1/3 of the width of a case body and at a position having a size equivalent to approximately 1/10 of the length of the case body and such that such that the safety groove had a radius of curvature equivalent to approximately 1/2 of the length of the case body. The safety groove was formed such that a vent had a thickness of approximately 57 μm at the middle of the safety groove and such that the vent had thicknesses of approximately 70 μm and approximately 90 μm, respectively, at predetermined positions approaching opposite ends of the safety groove, i.e., such that the thickness of the vent was gradually increased toward the opposite ends of the safety groove (see Example 1 of FIG. 7). It was confirmed that the safety groove was formed at a region of the case exhibiting a stress distribution equivalent to approximately 25 to 35% of the maximum stress $S_{MAX}$ of the case.

1-4 Manufacture of Battery

The cathode manufactured as described in Section 1-1 and the anode manufactured as described in Section 1-2 were wound into a roll and compressed while a separator was disposed between the cathode and the anode to manufacture a prismatic jelly-roll. The prismatic jelly-roll was placed in the aluminum prismatic case having the safety groove formed as described in Section 1-3, and an EC-EMC blending-based solution was impregnated as an electrolyte to manufacture a battery.

EXAMPLE 2

A battery was manufactured in the same manner as Example 1 except that a safety groove was formed such that a vent had a thickness of approximately 49 μm at the middle of the safety groove and such that the vent had thicknesses of approximately 55 μm and approximately 75 μm, respectively, at predetermined positions approaching opposite ends of the safety groove, i.e., such that the thickness of the vent was gradually increased toward the opposite ends of the safety groove, as shown in Example 2 of FIG. 7.

EXAMPLE 3

A battery was manufactured in the same manner as Example 1 except that a safety groove was formed such that a vent had a thickness of approximately 40 μm at the middle of the safety groove and such that the vent had thicknesses of approximately 45 μm and approximately 63 μm, respectively, at predetermined positions approaching opposite ends of the safety groove, i.e., such that the thickness of the vent was gradually increased toward the opposite ends of the safety groove, as shown in Example 3 of FIG. 7.

COMPARATIVE EXAMPLE 1

Figure 9:
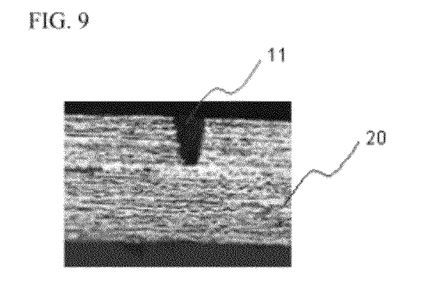
FIG. 9 is a photograph illustrating a vertical section of the safety groove of FIG. 1.

A battery was manufactured in the same manner as Example 1 except that a safety groove was formed at a corner region of a case as shown in FIG. 1, and a vent had a uniform thickness as shown in FIG. 9. The straight distance h between opposite ends of the safety groove of FIG. 1 is approximately 16 mm.

COMPARATIVE EXAMPLE 2

A battery was manufactured in the same manner as Example 1 except that a safety groove was formed at a top region of a case as shown in FIG. 3, and a vent had a uniform thickness, as shown in FIG. 9.

EXPERIMENTAL EXAMPLE 1

Five batteries manufactured according to Examples 1 to 3 and Comparative examples 1 and 2 were prepared, and the pressure of the batteries was gradually increased to measure rupture pressure of the batteries at which safety grooves of the batteries were ruptured first. The average results are indicated in Table 1 below.

TABLE 1

|  | Minimum vent thickness (μm) | Rupture pressure (kgf/cm²) |
| --- | --- | --- |
| Example 1 | 57 | 12.4 |
| Example 2 | 49 | 10.9 |
| Example 3 | 40 | 7.7 |
| Comparative example 1 | 173 | 6.5 |
| Comparative example 2 | 52 | 7.2 |

As can be seen from Table 1, the batteries of Examples 1 to 3, each of which had the arc-shaped safety groove formed at the specific region having low stress such that the thickness of the vent was gradually decreased toward the middle from the opposite ends of the safety groove, had rupture pressures of 12.4, 10.9, and 7.7 kgf/cm², which were relatively high.

On the other hand, the safety grooves of the batteries of Comparative example 1, each of which was formed at the region having relatively high stress, were easily ruptured even at low pressure although the thickness of the vent of each of the safety grooves of the batteries of Comparative example 1 was greater than the thickness of the vent of each of the safety grooves of the batteries of Examples 1 to 3.

Also, the safety grooves of the batteries of Comparative example 2, each of which was formed at the same position as in Examples 1 to 3 and had the thickness of the vent similar to that of Example 2 and uniform in the longitudinal direction, were ruptured even at a pressure lower than those of the batteries of Example 2 as well as Example 3 although the thickness of the vent of each of the safety grooves of the batteries of Comparative example 2 was greater than the thickness of the vent of each of the safety grooves of the batteries of Example 3.

EXPERIMENTAL EXAMPLE 2

Two batteries manufactured according to Examples 1 to 3 and Comparative example 1 were prepared, were fully charged, and hot plate tests were performed upon the batteries such that the batteries were exposed at a temperature of 250° C. The results are indicated in Table 2 below.

TABLE 2

|  | Rupture time (n = 1) | Rupture time (n = 2) | Average |
| --- | --- | --- | --- |
| Example 1 | 5 minutes 05 seconds | 4 minutes 54 seconds | 5 minutes |
| Example 2 | 4 minutes 42 seconds | 4 minutes 31 seconds | 4 minutes 37 seconds |
| Example 3 | 4 minutes 09 seconds | 4 minutes 18 seconds | 4 minutes 14 seconds |
| Comparative example 1 | 3 minutes 20 seconds | 3 minutes 08 seconds | 3 minutes 14 seconds |

As can be seen from Table 2, the batteries of Examples 1 to 3 had average rupture times, 5 minutes, 4 minutes 37 seconds, and 4 minutes 14 seconds, which were relatively long. On the other hand, the safety grooves of the batteries of Comparative example 1 were easily ruptured in relatively short times.

As the internal temperature of a battery is gradually increased, an electrolyte in the battery is decomposed, with the result that gas is generated in the battery. The internal pressure of the battery due to gas is also gradually increased with the passage of time.

Therefore, a battery having a safety groove according to the present invention is not easily ruptured at a middle or low pressure, at which the rupture of the battery is not allowed, thereby preventing injury due to leakage of an electrolyte and evaporated gas.

Through the above experiments, it can be seen that it is necessary to form a safety groove at a position of a battery where stress is low so as to effectively gas from the battery, thereby improving safety of the battery.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A prismatic secondary battery comprising an electrode assembly consisting of a cathode, an anode, and a separator mounted in a prismatic battery case in a sealed state, the battery case comprising a hexahedral case body open at a top thereof, the hexahedral case body being made of a metal material, and a case cap coupled to the open top of the case body, the case cap having an electrode terminal, wherein
the case body has a thickness of 0.4 mm or less,
the case body has at least one surface where a vertical length of the surface is greater than a lateral width of the surface, and the surface has a vertical center axis region that extends along the vertical length,
the case body has a stress distribution when under pressure,
a safety groove having a line-shape is provided at a region of the case exhibiting a stress distribution equivalent to 40% or less of a maximum stress ($S_{MAX}$) of the case in a high pressure state, the safety groove being configured to be ruptured when high pressure occurs in the battery,
the safety groove is configured in a structure in which a vent thickness of the case body is gradually decreased toward a middle from opposite ends of the safety groove in a longitudinal direction of the safety groove,
the safety groove is formed to intersect the vertical center axis region in the surface of the case body,
the safety groove is formed in an arc shape, the arc shape of the safety groove has a radius of curvature equivalent to ½ to 1.5 times of the vertical length of the case body,
the safety groove is formed at only a middle position of the case body, the middle position having a width equivalent to ¼ to ½ of the lateral width of the case body and the safety groove is formed at an upper position of the case body, the upper position having a length equivalent to 1/20 to ⅕ of the vertical length of the case body, and
the safety groove is formed at a region of the case body corresponding to a space defined between the open top of the case body and a top of the electrode assembly mounted in the case body.

2. The prismatic secondary battery according to claim 1, wherein the case body has a thickness of 02 to 0.4 mm.

3. The prismatic secondary battery according to claim 1, wherein the high pressure in the battery at which the safety groove is ruptured is twice or more internal pressure of the battery in a normal condition.

4. The prismatic secondary battery according to claim 1, wherein the safety groove is formed at a region of the case body exhibiting a stress distribution equivalent to 10 to 40% of the maximum stress ($S_{MAX}$) of the case.

5. The prismatic secondary battery according to claim 1, wherein the safety groove is formed in an upward arc shape in which the center of curvature of the arc shape is located at an upside or in a downward arc shape in which the center of curvature of the arc shape is located at a downside.

6. The prismatic secondary battery according to claim 1, wherein the vent thickness has an average value equivalent to 40 to 70% of the thickness of the case body.

7. The prismatic secondary battery according to claim 1, wherein a minimum vent thickness at the middle of the safety groove is equivalent to 20 to 50% of the thickness of the case body.

8. The prismatic secondary battery according to claim 1, wherein the vent thickness is gradually decreased toward the middle from the opposite ends of the safety groove.

9. The prismatic secondary battery according to claim 1, wherein the vent thickness at the middle of the safety groove is equivalent to 40 to 70% of the vent thickness at the opposite ends of the safety groove.

10. The prismatic secondary battery according to claim 1, wherein a vertical section of the safety groove is formed in a downward wedge shape.

11. The prismatic secondary battery according to claim 1, wherein a vertical section of the safety groove is formed in a trapezoidal shape.

12. The prismatic secondary battery according to claim 1, wherein the electrode assembly comprises a jelly-roll.

13. The prismatic secondary battery according to claim 1, wherein the secondary battery comprises a lithium secondary battery.

14. The prismatic secondary battery according to claim 1, wherein the at least one surface includes a front and rear side of the case body and the safety groove is provided in plural such that both the front and rear side of the case body are provided with one of the safety grooves.

* * * * *